Aug. 25, 1970

J. W. KUNKEL ET AL 3,525,979

DIGITAL SIGNAL PROCESSING AND DISPLAY FOR AERIAL
NAVIGATION SYSTEM

Filed Nov. 15, 1966

INVENTORS
James W. Kunkel &
Daniel F. Thomas

BY

ATTORNEYS

United States Patent Office 3,525,979
Patented Aug. 25, 1970

1

3,525,979
DIGITAL SIGNAL PROCESSING AND DISPLAY
FOR AERIAL NAVIGATION SYSTEM
James W. Kunkel, 1507 Marlee Lane, Arlington, Tex.
76010, and Daniel F. Thomas, 1844 N. Highway 77,
12, Carrollton, Tex. 75006
Filed Nov. 15, 1966, Ser. No. 594,494
Int. Cl. G01c 21/00
U.S. Cl. 340—27       10 Claims

ABSTRACT OF THE DISCLOSURE

Airborne apparatus for processing Omni navigation signals and displaying to the pilot of an aircraft the bearing of the aircraft. The bearing information is displayed on the aircraft instrument panel in a digital manner by processing the 30-cycle variable phase signal and the reference signal derived from the 9960-cycle subcarrier of the omnidirectional signals.

This invention relates to signal processing and digital output display arrangements for an aerial navigation system.

In general aviation, the standard navigation system is of the omnidirectional type, commonly referred to as Omni, wherein the pilot of an aircraft can determine its bearing with reference to the location of selected Omni transmitter. The transmitters at various geographical locations operate on different VHF carrier frequencies, but each conveys a pair of 30-cycle signals which when received by the aircraft provide an indication of the angular position of the aircraft relative to the particular transmitter by means of the phase relationship of these signals. Ordinarily one of the 30-cycle signals is established as a phase reference signal and is frequency modulated upon a subcarrier having a nominal frequency of 9960 c.p.s., the subcarrier in turn being amplitude modulated upon the VHF carrier. The other 30-cycle is established as a variable phase signal with the phase of this signal in relation to the reference signal being dependent upon the angular position of the receiver relative to the transmitter. The Omni transmitter has a number of directional antennas, each pointting radially outward from the transmitter location in a particular direction, and each having a sufficiently broad beam to cover its own area as well as to overlap somewhat into the areas to the adjacent antennas. These antennas are fed by a rotating system, the maximum amplitude of the transmitted power being fed to the various antennas sequentially in a repetitious cycle, with the result that to a receiver picking up the transmitted signal at a distance the carrier appears to be amplitude modulated at the rate of rotation of the transmitter supply system. This rate of rotation is established at 30 complete revolutions per second and is synchronized with the 30-cycle reference signal such that to a receiver directly north of the transmitter the signals will appear in phase, while other angular locations exhibit a range of phase relationships of zero through 360°.

In the aircraft, the two amplitude modulated signals, one being the 30 cycle variable phase signal resulting from rotation of the transmitter supply system and the other being the 9960-cycle subcarrier, are detected in a standard VHF receiver which is concurrently used to receive voice communications from the same Omni transmitter. In a navigation signal processing unit, the 30-cycle reference signal carried by the 9960-cycle subcarrier is detected by frequency discrimination, and in conventional Omni receiver equipment the relative phase of the two 30-cycle signals is mesured in order to determine the bearing of the aircraft relative to the transmitter. Ordinarily, a manually operable variable phase shifter is used for shift-

2 ing the phase of one of the signals prior to the phase comparison. The dial of this variable phase shifter is set for whatever course of flight is desired, and if the aircraft is on course the indicator meter associated with the phase detector produces a zero or null reading. The reading of this meter is ambiguous because of the inability of the phase detector arrangement to measure the direction or sense of the phase difference. To account for this ambiguity a second phase comparison is available wherein the reference signal is in effect shifted 180° with respect to the other comparison. By selecting between these two phase comparisons ordinarily by a switch located on the instrument panel referred to as a "To-From" switch, the pilot can determine whether the aircraft is on course or off by 180°.

While the Omni navigation system just described has been very successful in operation, one of the disadvantages of conventional Omni receiving equipment is that the pilot must first determine an approximate position or bearing relative to a selected Omni transmitter, and then set this bearing information onto the manually operable phase shifter. Then if the aircraft is not on the prescribed course, the null meter will not indicate zero, although the deviation of the meter needle will not indicate the amount of angular deviation from the bearing set into the variable phase shifter. The pilot then either changes the heading of the aircraft until a null reading is obtained, or the manually operable phase shifter is varied until a null reading indicates that the correct bearing is set into the phase shifter. In either event the pilot is unnecessarily distracted by the procedure for obtaining this bearing information since he must first estimate the bearing, set it into the instrument, interpret the resulting reading, then take whatever steps needed to correct the reading if a null is not obtained.

It is the principal object of the present invention, therefore, to provide apparatus for processing Omni navigation signals in an aircraft in a manner such that the output of the receiver system is displayed to the pilot in a clear and unambiguous manner, while requiring the pilot to perform a minimum of manual operating steps or calculations in arriving at a reading of the bearing of the aircraft relative to the selected Omni transmitter.

In accordance with this invention, the bearing or angular position information derived from the Omni signal is displayed on the aircraft instrument panel in a digital manner, with no requirement that an estimate of the aircraft position or a desired heading be entered into the instrument by the pilot before obtaining a meaningful reading. This display is produced by first processing the 30 cycle variable phase signal and the reference signal derived from the 9960 subcarrier in such a manner as to provide square waves, retaining the original phase relationship. The square waves are differentiated or otherwise used to produce triggering pulses to drive a bistable circuit which generates a pulse output wherein the pulse widths correspond in length to the phase difference between the reference and the variable phase 30-cycle signals. To account for the phase comparison ambiguity the square wave derived from the reference signal may be alternatively inverted or, in other words, triggering pulses provided which are displaced by one-half cycle. An oscillator is provided which produces pulses at a frequency which is some large multiple of the 30-cycle signals, conveniently 360 so that a resolution of one degree may be obtained, and the variable width pulse output from the bistable circuit is used to gate the oscillator output into a digital counter. This arrangement is periodically sampled at a fairly slow rate so that a new reading is displayed to the pilot every few seconds, the sampling mechanism also functioning to reset the counter. The output of the counter is displayed on the aircraft instrument panel in digital form, and will be a direct reading of the aircraft bearing relative to the Omni transmitter.

The novel features believed characteristic of this invention are set forth in the appended claims. The invention itself, however, as well as other objects and advantages thereof, may best be understood by reference to the following detailed description of a particular embodiment, when read in conjunction with the accompanying drawings, wherein:

Figure 1:
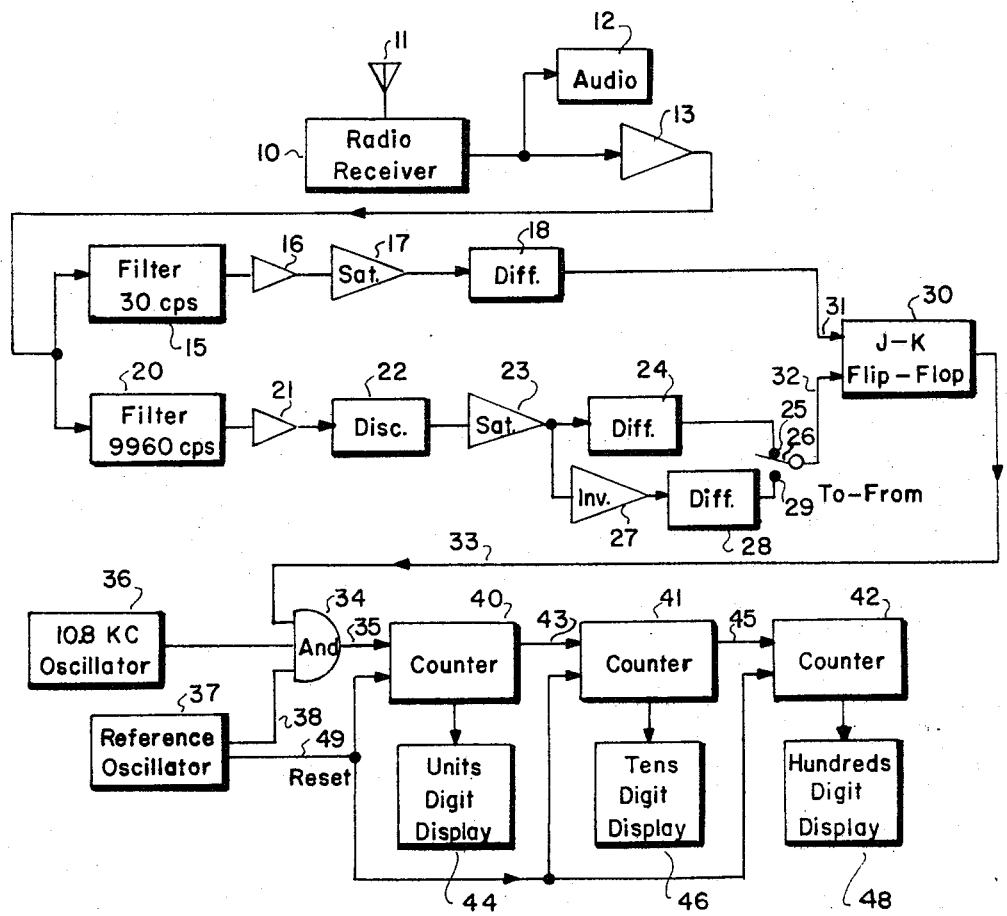
FIG. 1 is a block diagram of a signal processing unit in a receiver for a navigation system in accordance with this invention.

With reference to FIG. 1, a receiver for a navigation system of the Omni or omnidirectional type, with provision for a digital output display in accordance with this invention, will include a radio receiver 10 which may be conventional VHF equipment which has provision for tuning to the carrier frequency of the selected Omni station. The receiver is of course coupled to an antenna 11 positioned on the exterior of the aircraft. The output of the receiver 10 includes an audio channel 12, ordinarily including filters to reject the 30-cycle and 9960-cycle signals, along with amplifiers and a loudspeaker or headphone output for conveying to the pilot the identification code or other voice communication from the Omni transmitter.

The output of the receiver 10 is also coupled through an amplifier 13 to the navigation signal processing unit. This unit comprises a first channel including a low pass filter 15 which accepts the 30-cycle signal that is amplitude modulated upon the VHF carrier by rotation or sequential energization of the transmitting antennas. The output of the 30-cycle filter 15, being a sinewave at 30 c.p.s. and having a phase related to the aircraft position, is applied through an amplifier 16, which may include phase correction means to account for unwanted phase shifts in the filter or other elements, to the input of a saturated amplifier stage 17. This stage is merely a conventional limiting amplifier wherein the amplifying element is driven into saturation for both positive-going and negative-going portions of the 30-cycle sinewave input. The output of the amplifier 17 is a square wave having a 30 c.p.s. repetition rate, at a phase which is of course related to the aircraft position relative to the transmitter. The output of the limiting amplifier 17 is applied to the input of the differentiator circuit 18 which may be merely a capacitor-resistor arrangement that would convert the square wave output of the amplifier 17 into a series of positive-going and negative-going spikes. The differentiator circuit 18 also includes a diode which removes the negative spikes and passes only the positive-going excursions of the square waves.

The other channel of the navigation signal processing unit includes a high pass filter 20 which accepts the 9960-cycle signal that is amplitude modulated upon the VHF carrier. This filter 20 passes a band centered around 9960 c.p.s., and may appropriately have a pass band from 9480 through 10,440 c.p.s. to accept most of the side bands caused by the frequency modulation of the subcarrier, while rejecting voice communication frequencies and other unwanted frequencies. As above, the output of the filter 20 is connected to an amplifier which may include phase correcting networks. The output of the amplifier 21 is connected to a frequency discriminator 22 which may be of conventional construction and which functions to recover the 30 c.p.s. reference signal from the 9960-cycle subcarrier. The output of the frequency discriminator 22, being a 30 c.p.s. sinewave having a fixed phase regardless of the aircraft position, is applied to the input of a saturated amplifier 23 which converts the sinewave to a square wave. The output of the limiting amplifier 23 is connected through a first differentiator circuit 24 to one pole 25 to a "To-Form" switch 26. The output of the amplifier 23 is also connected through an inverter 27, which merely functions to shift the square wave 30-cycle reference signal by 180°, to a second differentiator circuit 28. The output of the differentiator is applied to the other pole 29 to the "To-From" switch 26. Each of the differentiators 24 and 28 functions to reject negative-going excursions and produce an output of positive-going spikes, the ones appearing on the pole 29 of course corresponding to the negative-going excursions of the output of the amplifier 23 due to the action of the invertor 27.

The outputs of the two channels just described, being positive-going pulses each having a repetition rate of 30 per second and being displaced in phase relative to one another by an amount related to the aircraft position, are applied to a bistable multivibrator circuit 30 which is of the type generally known as a "J-K Flip-Flop." This circuit 30 functions to produce an output pulse which has a leading edge occurring when a positive pulse is applied to the J input 31 and a trailing edge occurring when a positive pulse is applied to the K input 32. The output of the circuit 30 will thus be a train of pulses having a repetition rate of 30 per second with the pulse width being linearily related in time to the angular position of the aircraft in relation to the Omni transmitter. This output is coupled to an arrangement for providing a digital display of this pulse width and thus of the aircraft heading in a manner which is clear and unambiguous to the pilot.

The output of the flip-flop circuit 30 is coupled by a line 33 to a first input of an AND gate 34. The AND gate 34 is of conventional form and functions to permit voltages or signals to pass through and appear on its output 35 only when positive voltages or signals appear simultaneously on each of its three inputs. One of the other inputs to the AND gate 34 is the output of an oscillator 36 which produces a 10,800 c.p.s. pulse train. This repetition rate is selected as being the product of 30 cps. times 360° so that a resolution of one degree is produced. The oscillator 36 may be a conventional free-running multivibrator. The other input to the AND gate 34 is the output of a reference oscillator 37. The output of the reference oscillator 37 appearing on a line 38 would be a single positive pulse occurring every 10 seconds, for example. The frequency of occurrence of this pulse need not be precise, and so the timing circuitry of the oscillator 37 need not be accurately constructed; however, the pulse length of 1/30 second must be exact and also it is preferable that the leading edge of such pulse coincide with the leading edge of any one of the output pulses of the flip-flop 30. Accordingly, suitable synchronization means of conventional form may be used to initiate the pulse output of the oscillator 37 at the trailing edge of the pulse output of the flip-flop 30 and terminate such pulse at the trailing edge of the next succeeding pulse output from the circuit 30. In this manner, the output of the reference oscillator will necessarily be 1/30 second in length and synchronized with one period of the flip-flop output. The output of the reference oscillator 37 is also used to reset the digital counters as will be subsequently described.

In the manner just set forth, the AND gate 34 will be enabled or closed about every ten seconds, or other period as selected in the design of the reference oscillator 37, and during this period will pass the 10.8 kc. pulses from the oscillator 36 for an interval of time as determined by the width of one of the positive pulses from the bistable circuit 30. The number of pulses from the oscillator 36 permitted to pass through the AND gate to the output line 35 during one sampling cycle may vary from zero up to 360, the latter being the product of 1/30 second times 10,800 c.p.s. The number of such pulses is counted and displayed by a decimal type counting arrangement including three serially connected counters 40, 41 and 42.

The counter 40 is a conventional decimal or decade counting arrangement which may comprise a series of bistable flip-flop circuits connected in a serial arrangement to step through a sequence up through 10 as pulses are applied to the input from the line 35, and to produce an output pulse on a line 43 for every ten input pulses. The condition of the counter 40 is continuously indicated on a suitable display 44 which may be any one of a number of commercially available devices such as a Nixie display tube. The device 44 will of cource display the least significant or units digit. The counter 41, of the same form as the counter 40, receives input pulses from the counter 40 by the line 43 and in like manner steps through a sequence up through 10 and produces an output on a line 45 for every tenth pulse applied to the line 43. At the same time the condition of the 41 is indicated by a display unit 46 which is exactly like the unit 44 and which indicates the next significant digit or the tens digit. The counter 42, which receives a pulse on the line 45 for every 10 pulses on the line 43, may be similar in construction to the counters 40 and 41 but need not count up to 10 since the highest number to be registered is 360. This counter 42 may thus be constructed to count only up to 3, and the output of this counter is displayed on a unit 48 which indicates the hundreds digit.

All of the counters 40, 41 and 42 may be simultaneously reset to zero by a pulse applied to a line 49 which is an output of the reference oscillator 37. The output portion of the reference oscillator 37 going to the line 49 may include a differentiator circuit so that only a pulse corresponding to the positive going or leading edge of the pulse applied to the line 38 appears on this line 49, thereby causing all of the counters to be reset immediately before any of the 10.8 kc. pulses from the oscillator 36 appear on the line 35. When the counters 40, 41 and 42 are reset to zero, of course each of the display units 44, 46 and 48 will be correspondingly reset to a zero indication.

Figure 2:
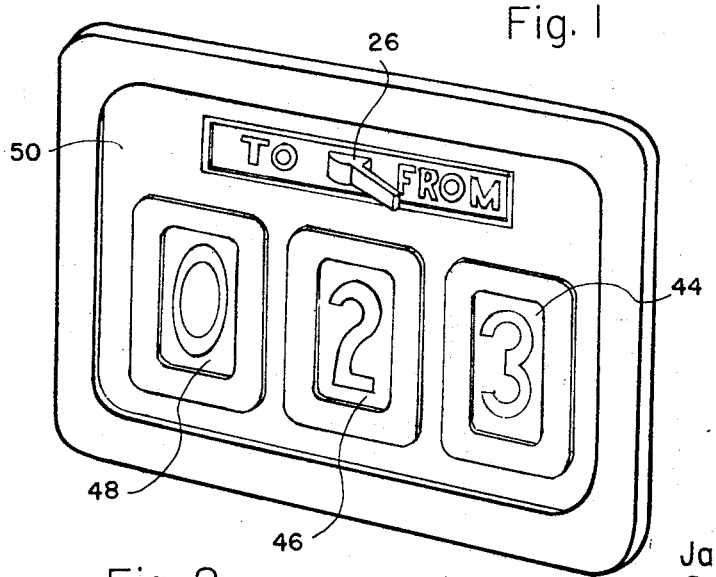
FIG. 2 is a pictorial view of an indicator unit which may be used with the system of FIG. 1.

The decimal or digital output of the navigation receiver of this invention is displayed on the aircraft instrument panel by an indicator unit 50 which may be of the form illustrated in FIG. 2. The units, tens and hundreds digit display elements 44, 46 and 48 are arranged in the usual order in a manner such as to be clearly visible to the pilot. In a position adjacent this indication the To-From switch 26 is provided along with appropriate legends on the panel. Ordinarily, a suitable dial and indicator arrangement for the selection of the particular Omni station to be received would be associated with this display panel.

Figure 3:
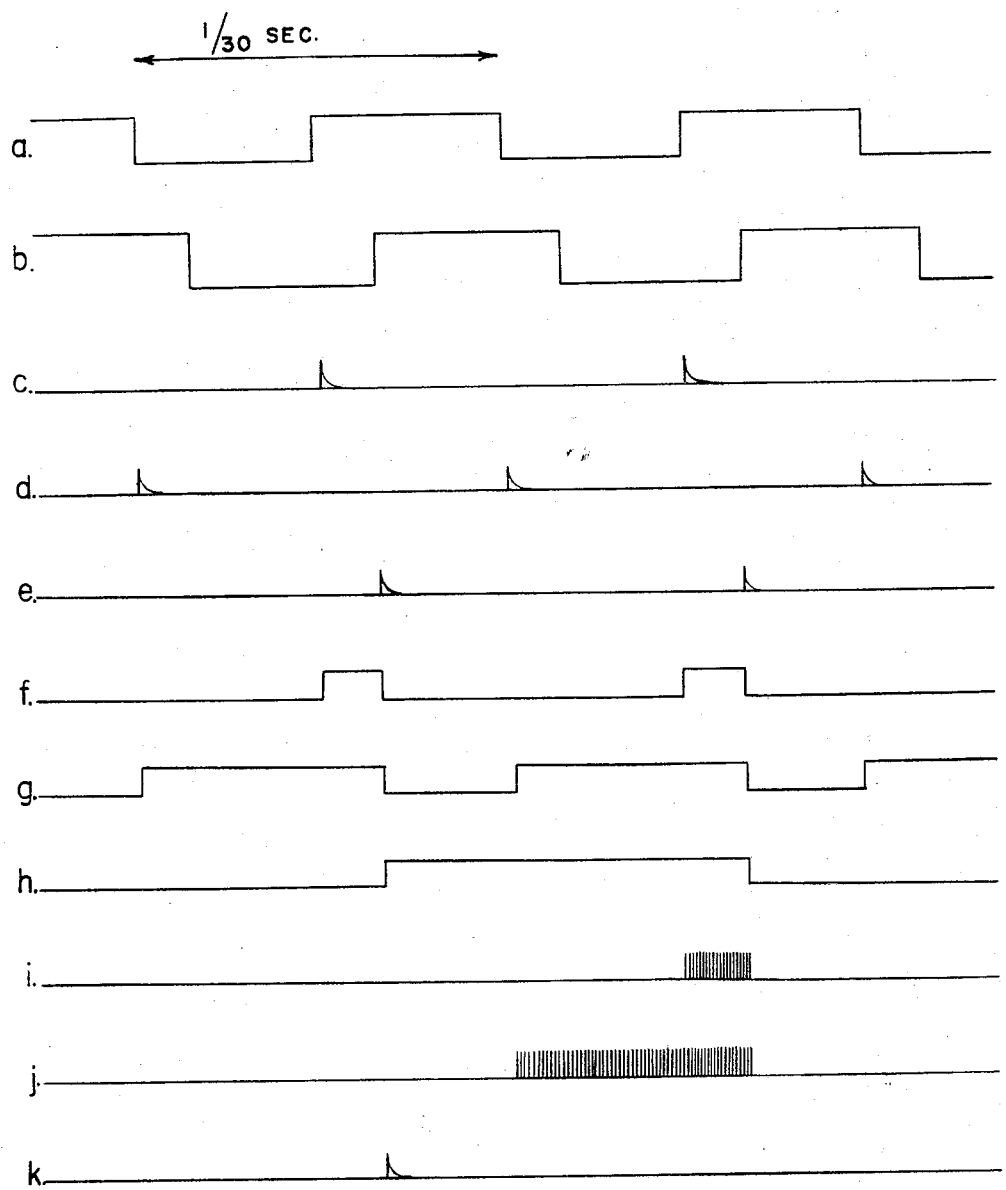
FIGS. 3a–3k are graphic representations of electrical waveforms appearing at various points in the system of FIG. 1.

The operation of the navigation receiver system described thus far may perhaps be best understood by reference to the waveforms graphically illustrated in FIGS. 3a through 3k. It will be noted that the voltage waveform appearing at the output of the saturated amplifier 23, representing the 30-cycle reference signal derived from the frequency-modulated 9960-cycle subcarrier, will be a square waveform as seen in FIG. 3a. In like manner, the output of the saturated amplifier 17 in the other channel will be a square waveform as seen in FIG. 3b which is displaced in phase with respect to the reference 30-cycle square wave in FIG. 3a. In the illustrated example it will be seen that the variable phase 30-cycle signal of FIG. 3b lags the reference 30-cycle signal of 3a by 60°, this corresponding to a heading of 60° of the aircraft relative to the Omni transmitter station. The output of the differentiator 24 in the reference signal channel will be a train of positive pulses as illustrated in FIG. 3c, these pulses appearing on the pole 25 of the To-From switch 26. At the same time the output of the differentiator 28 in the reference channel will be a train of positive pulses as seen in FIG. 3d, these being 180° displaced with respect to FIG. 3c and corresponding to the negative-going steps of the 30-cycle reference signal of FIG. 3a. The pulses of FIG. 3d will appear on the pole 29 of the To-From switch 26, and it is seen that by operation of the switch 26 either of the waveforms of FIG. 3c or 3d may be applied to the input 32 of the circuit 30. On the other input 31 of the flip-flop 30 will appear a train of pulses as seen in FIG. 3e which correspond to the differentiated positive-going portions of the 30-cycle variable phase signal of FIG. 3b. The flip-flop 30 will be switched to initiate a pulse each time a positive pulse appears on the input 32, and so when the switch 26 is in contact with the pole 25 the pulses of FIG. 3c will be controlling and the output of the circuit 30 will appear as seen in FIG. 3f. The trailing edges of the pulses of FIG. 3f will of course be determined by the positive pulses of FIG. 3e appearing on the input 31. On the other hand, if the To-From switch 26 contacts the pole 29, the pulses of FIG. 3d will be controlling and the output of the flip-flop 30 appearing on the line 33 will resemble the train of somewhat longer pulses as seen in FIG. 3g. The length of the pulses of FIG. 3f will be $\frac{1}{180}$ of a second, corresponding to 60° whereas the lengths of the pulses of FIG. 3g will be $\frac{4}{180}$ of a second, corresponding to 240°. The output of the reference oscillator 37 appearing on the line 38 as an input to the AND gate 34 will be a pulse of $\frac{1}{30}$ second length as seen in FIG. 3h, one of such pulses occuring only every 10 seconds or such other period as selected for the sampling rate. The output of the AND gate 34 as it appears on the line 35 will be a burst of 10.8 kc. pulses as seen in either FIG. 3i or FIG. 3j depending upon whether the To-From switch 26 contacts the pole 25 or the pole 29, respectively. The burst in FIG. 3i corresponding in length to one of the pulses of FIG. 3f will contain $\frac{1}{180}$ times 10,800 or 60 pulses, while the burst of FIG. 3j will contain $\frac{4}{180}$ times 10,800 or 240 pulses. These bursts of 10.8 kc. pulses are of course registered on the counters 40, 41 and 42 and displayed on the units 44, 46 and 48 as the numerals 060 and 240 respectively. The reset pulse appearing on the line 49 as an output of the reference oscillator 37 will be a single pulse as illustrated in FIG. 3k, of course occurring only once every 10 seconds or the like.

It would be noted that the signal processing apparatus of this invention provides for the aircraft pilot an indication in decimal form of the bearing or angular position of the aircraft relative to the Omni station which he has selected, with the reading being in units of degrees. The pilot is required to make no adjustments or calculations, but yet a clear and unambiguous reading is obtained.

The Omni transmitting system which has been referred to herein may be subject to erroneous readings caused by variations in the phase of the received signal due to atmospheric conditions or electrical noise generated in the aircraft, or variations in the phase of the transmitted signal itself due to the switching of the antennas at the transmitter site. This random phase variation is sometimes referred to as jitter. In the conventional Omni receiver this phase variation is not apparent in the meter readout due to damping or inertia of the meter movement. However, in the digital readout system described herein an unfavorable environment of noise may result in variation of the indicated bearing by as much as perhaps three or four degrees between successive readings. This would be annoying to the pilot and tend to cause loss of confidence in the accuracy of the system. The problem can be alleviated in the system of this invention by sampling the phase information of the received signal over a longer period of time rather than obtaining one pulse which represents only one cycle of the 30-c.p.s. phase information. Since the spurious phase variations are usually random and of very short persistence, the effects of the jitter can be virtually eliminated by sampling the phase relationship of the received signal over a number of cycles, thus providing an average reading for this sample.

Figure 4:
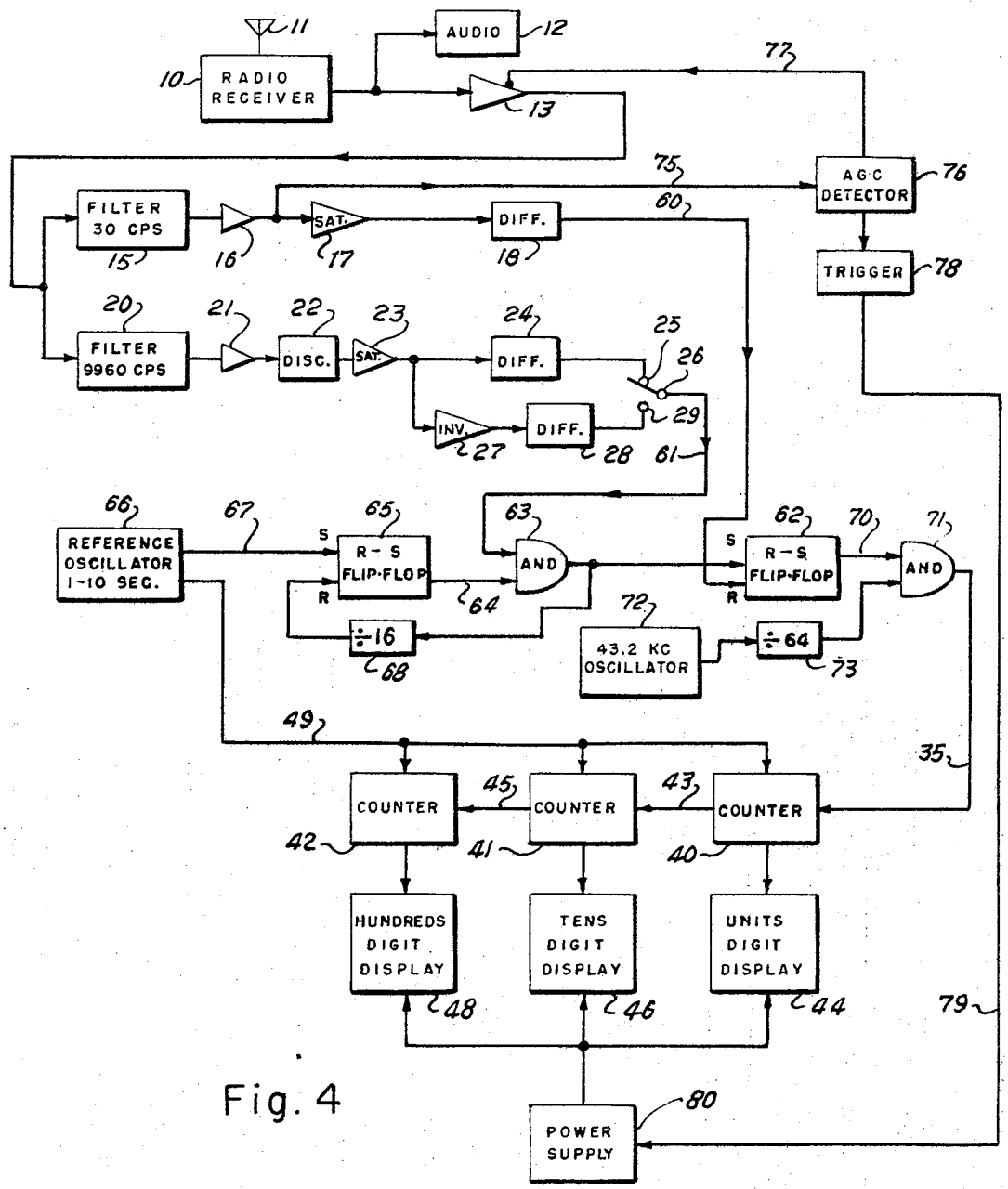
FIG. 4 is a block diagram of a system in accordance with another embodiment of the invention.

Averaging of the detected phase relationship may be accomplished by the system shown in block diagram in FIG. 4 which represents another embodiment of this invention. The receiver of FIG. 4 is similar to that shown in FIG. 1, and comprises a conventional receiver 10 providing outputs to an audio section 12 and through a isolating amplifier 13 to 30-cycle and 9960-cycle filters 15 and 20 in separate processing channels. The variable phase channel includes a 30-cycle amplifier 16 and a saturated or limiting amplifier 17 along with a differentiator circuit 18 which produces a positive going pulse train as discussed above with reference to FIG. 3e. The other channel includes an amplifier 21 driving a discriminator 22 to recover the 30-cycle reference signal which is then coupled through a limiting amplifier 23 to the differentiator 24 or to the differentiator 28 through an inverter 27. The outputs of the differentiators 24 and 28 are applied to poles 25 and 29 to the To-From switch 26. It will be noted that up to this point the system is exactly like the arrangement of FIG. 1, and the pulses appearing on the lines 60 and 61, corresponding to FIG. 3e and to either FIG. 3c or FIG. 3d depending upon the position of the switch 26 are applied to the sampling and averaging portion of the circuit.

The pulses on the line 60, representing the variable phase signal, are applied to the reset input of a conventional R-S flip-flop circuit 62, while the pulses on the line 61, representing the reference signal, are applied to the set input of the flip-flop 62 through an AND gate 63. The gate 63 will permit the pulses on the line 61 to reach the input of the flip-flop circuit 62 only when a voltage is present on the other input 64, this input being connected to the output of another R-S flipflop 65. The bistable circuit 65 is driven into the set condition by a pulse from a reference oscillator or cycle generator 66 appearing on a line 67. The cycle generator may be a conventional monostable multivibrator which produces a pulse output once every few seconds, the interval being variable by the operator or pilot from perhaps one second up to ten seconds depending upon how frequently he wishes the bearing information to be updated. This control of the interval between pulses may be accomplished by a variable resistor or the like in the monostable multivibrator. The pulse output from the reference oscillator 66, applied by the line 57 to the flip-flop 65, sets the circuit 65 to a condition such that it applies a voltage to the input 64 of the AND gate 63 to enable the gate to permit the pulses on the line 61 to pass through the gate to the set input of the flip-flop 62. The output of the AND gate 63 is also connected to the input of a circuit 68 which functions to count up to sixteen or divide by sixteen. The circuit 68 may be four conventional bistable stages connected in series and it will produce a pulse at the reset or R input to the flip-flop 65 after sixteen pulses have appeared on the output of the AND gate 63. The pulse on the R input switches the condition of the flip-flop 65, thus changing the voltage on the input 64 and prohibiting pulses from passing through gate 63. It is thus seen that the gate 63 will be opened when a pulse is produced by the reference oscillator 66 and will remain open for sixteen of the pulses on the line 61 then will close until another sample pulse appears on the line 67. Since the repetition rate of pulses on the line 61 is 30 per second, the sampling period will be 16×1/30 or 16/30 second.

The flip-flop circuit 62 is switched to a condition which produces a voltage on an output 70 each time a pulse from the line 61 reaches the S input. This circuit 62 is switched back to the other condition each time a pulse occurs on the line 60, and so the voltage on the output 70 will be a burst of sixteen pulses wherein the pulse widths correspond to the phase difference between the received signals. Of course the burst is repeated every one to ten seconds according to the output of the oscillator 66. The remainder of the system is essentially the same as that of FIG. 1, with the exception that the pulse frequency used for driving the counters is lower by a factor of 16.

The output 70 is applied to one input of an AND gate 71, while the other input receives pulses at a rate of 10.8 kc.÷16 or 675 c.p.s., preferably derived from a 43.2-kc. oscillator 72 and a divider circuit 73 which divides by sixty-four, the latter being six conventional bistable stages connected in series. This arrangement is used because it is easier to obtain a stable oscillator at a higher frequency, as 43.2 kc., than at some lower frequency, as 10.8 kc. A crystal oscillator may well be used for this purpose.

The output of the AND gate 71 is applied by a line 35 to a counting arrangement exactly as described above with reference to FIG. 1 including three scale-of-ten counters 40, 41 and 42 and associated units, tens, and hundreds digit displays 44, 46 and 48. The counters are reset to zero upon the occurrence of a pulse output from the reference oscillator 66 appearing on an output line 49.

In the system of FIG. 4, the indication on the display units 44, 46 and 48 will be the average of the detected phase difference between the reference and variable phase signals over sixteen cycles of these signals. Accordingly, most spurious phase variations, or noise which would appear as a phase variation, is averaged out and a true reading is displayed. The circuitry used to divide by sixteen and average the signal over sixteen cycles, however, results in a longer count time by a factor of 16. This count time will be apparent to the operator as he will see the readout blur for the time of the count which is 16/30 or about one-half second. Due to the short duration of the count it should not be objectionable, although the blur of the readout may be avoided by adding a memory to the counters which would store the preceeding count until a new count has been accumulated. A suitable memory system would be flip-flops corresponding to the Nixie tube or display unit inputs and having a gate in each line between the counters 40, 41 and 42 and the displays 44, 46 and 48. At the end of the count cycle the output of the counters 40, 41 and 42 would be gated into the flip-flops to set them instantaneously, resulting in a change on the indication of the Nixie tubes. Gating here would be operated by the cycle generator 66 such that when a new cycle is initiated the count stored in the counters 40, 41 and 42 would be gated into the memory, then the new count accumulated in the counters with the counters disconnected from the memory flip-flops which actually drive the Nixie tubes. Also, the stop count pulse from the output of the divide by sixteen circuitry 68 could be used for the gating or switching, in which even there would be no delay between the indication and actual reading.

The system of FIG. 4 further includes provision for removing any indication on the display units 44–48 when the signal being received is too weak to produce an accurate reading. In fringe areas the Omni signal which may be received may be sufficient to produce an indication but the reading would be erroneous. In conventional Omni receivers this is accounted for by a "flag" which is an electromechanical device subject to sticking and like failures associated with meter movements in the unfavorable environment of an aircraft. These problems are avoided in the system of FIG. 4, and improved operation obtained, by an entirely electronic arrangement. The output of the amplifier 16 in the 30-cycle variable phase channel is coupled by a line 75 to a conventional AGC detector 76 which functions to produce a DC voltage on an output 77 proportional in magnitude to the received signal level. This AGC voltage is coupled back to the isolating amplifier 13 to vary the gain of this amplifier in inverse relation to the signal level. The output of the amplifier 13 thus tends to maintain a constant level over a wide range of received signal amplitudes. In addition, an output of the AGC detector 76 is coupled to a trigger circuit or threshold detector 78 which functions to produce an output on a line 79 only when the detected AGC voltage exceeds a predetermined level. The line 79 is connected to a power supply 80 which supplies operating voltage to the display units 44-48. Nixie display tube, for example, require perhaps a 170-volt supply voltage, in the absence of which no visible indication is produced. Operating voltage for the display units is thus provided only when the trigger circuit 78 produces an output, and so a number will appear on the panel display 50 only when the received signal is high enough to produce an accurate reading. This arrangement may of course be used with the system of FIG. 1 as well as that of FIG. 4.

While the digital output navigation receiver of this invention has been described with reference to specific embodiments, it is understood of course that this description is not to be construed in a limiting sense. Various modifications of the disclosed embodiments, as well as other embodiments of the invention, will be apparent to those skilled in the art upon reference to this application. It is therefore contemplated that the appended claims will cover any such modifications or embodiments as fall within the true scope of the invention.

What is claimed is:

1. Digital signal processing and display apparatus for a signal receiving unit of an omnidirectional aerial navigation system of the type wherein an RF carrier is transmitted from a fixed location on the ground, the carrier having a reference signal of a given frequency and fixed phase contained thereon and also having a variable phase signal of said given frequency modulated thereon, the variable phase signal varying in phase relative to said reference signal as a function of the position of the signal receiving unit relative to the transmitter location, said apparatus comprising: a first channel responsive to said variable phase signal for producing a first pulse output having a repetition rate corresponding to said given frequency and having a phase corresponding to that of said variable phase signal, a second channel responsive to said reference signal for producing a second pulse output having a repetition rate corresponding to said given frequency and having a phase corresponding to that of said reference signal and also for producing a third pulse output having a repetition rate corresponding to said given frequency and having a phase 180° relative to that of said second pulse output, bistable circuit means connected to receive said first pulse output and selectively either of said second and third pulse outputs and adapted to produce electrical pulses having a repetition rate corresponding to said given frequency and having a pulse width corresponding in time to the phase displacement between said first and either of said second and third pulse outputs, a generator of electrical impulses having a frequency corresponding to a large multiple of said given frequency, means for producing a periodic sampling pulse at a repetition rate many times slower than said given frequency, a plurality of serially-connected digital counter stages, means for gating said electrical impulses to the input of the first of said counter stages upon the occurrence of said sampling pulse for a preselected period, and visible display means coupled to said digital counter stages for indicating the number of said electrical impulses registered therein to provide a digital display of the difference in phase between said reference signal and said variable phase signal.

2. Apparatus according to claim 1 wherein said means for gating the electrical impulses to said input comprises a three input AND gate with the three inputs connected separately to receive said electrical pulses, said electrical impulses, and said sampling pulse.

3. Apparatus according to claim 1 wherein the second and third pulse outputs of said second channel are connected separately to the poles of a double pole switch with the armature of said switch being connected to said bistable circuit means whereby said bistable circuit means selectively receives either of said second and third pulse outputs, said switch being positioned adjacent said visible display means and providing a "To-From" indication.

4. Apparatus according to claim 1 wherein means are provided for resetting said digital counter stages upon the occurrence of said sampling pulse.

5. Apparatus according to claim 1 wherein said periodic sampling pulse has a pulse duration equal to the period of said electrical pulses produced by said bistable circuit means.

6. Apparatus according to claim 1 where said means for gating said electrical impulses to the input of the first of said counter stages includes means for permitting a preselected number of electrical pulses to occur for each periodic sampling pulse whereby said visible display means indicates an average number of electrical impulses occurring during said electrical pulses.

7. Apparatus according to claim 1 wherein said electrical impulses have a frequency of 360 times said given frequency whereby said digital display will be in units of degrees of angle.

8. Apparatus according to claim 6 wherein said multiple of said given frequency comprises 360 divided by said preselected number whereby said digital display is in units of degrees of angle.

9. Apparatus according to claim 8 wherein an automatic gain control voltage is detected and means are provided to control the level of signals applied to said channels in response to such voltage, and wherein means are provided to render said display units operative only when such voltage exceeds a predetermined level.

10. In an airborne receiver for aircraft navigation signals of the type providing a pair of signals of a given frequency displaced in a phase relative to one another in a manner related to the bearing of the aircraft relative to a remotely located transmitter: comprising means for producing electrical pulses responsive to the phase displacement between the two signals at said given frequency and having a pulse width corresponding in time to the phase displacement between said pair of signals, clock means for producing electrical impulses at a rate which is a large multiple of said given frequency, a digital counter having a visible output display for indicating the number of electrical impulses applied to an input of the digital counter, and means for periodically gating said electrical impulses to said input of the digital counter for the duration of a given number of said electrical pulses and at a repetition rate many times slower than that of said given frequency.

References Cited

UNITED STATES PATENTS 3,332,080  7/1967  Verwey _____ 235—150.26 XR

ALVIN H. WARING, Primary Examiner

U.S. Cl. X.R.

235—150.26; 340—23; 343—102